US008462621B2

(12) United States Patent
Ramakrishnan et al.

(10) Patent No.: US 8,462,621 B2
(45) Date of Patent: Jun. 11, 2013

(54) SYSTEMS AND METHODS OF MULTICAST RECONFIGURATION USING CROSS-LAYER INFORMATION

(75) Inventors: Kadangode Ramakrishnan, Berkeley Heights, NJ (US); Robert Doverspike, Tinton Falls, NJ (US); Murat Yuksel, Reno, NV (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 391 days.

(21) Appl. No.: 12/509,760

(22) Filed: Jul. 27, 2009

(65) Prior Publication Data
US 2011/0019534 A1   Jan. 27, 2011

(51) Int. Cl.
*G01R 31/08* (2006.01)

(52) U.S. Cl.
USPC .......................................... 370/217; 370/245

(58) Field of Classification Search
USPC ................. 370/216, 217, 218, 221, 222, 225, 370/228, 252, 242, 243, 244, 245
See application file for complete search history.

(56) References Cited

U.S. PATENT DOCUMENTS

| 5,331,637 | A | * | 7/1994 | Francis et al. | 370/408 |
| 5,946,316 | A | * | 8/1999 | Chen et al. | 370/408 |
| 6,587,904 | B1 | * | 7/2003 | Hauck et al. | 710/107 |
| 7,398,321 | B2 | * | 7/2008 | Qiao et al. | 709/239 |
| 7,656,792 | B2 | * | 2/2010 | Zhang et al. | 370/228 |
| 7,719,960 | B2 | * | 5/2010 | Atlas et al. | 370/222 |
| 7,826,367 | B2 | * | 11/2010 | So | 370/235 |
| 7,830,785 | B2 | * | 11/2010 | Li et al. | 370/216 |
| 2007/0133530 | A1 | * | 6/2007 | Previdi et al. | 370/390 |
| 2007/0253416 | A1 | * | 11/2007 | Raj | 370/390 |
| 2007/0263532 | A1 | * | 11/2007 | Mirtorabi et al. | 370/228 |
| 2008/0095047 | A1 | * | 4/2008 | Skalecki et al. | 370/225 |

OTHER PUBLICATIONS

"AT&T U-verse TV," http://www.att.com/gen/press-room?pid=5838.
http://www22.verizon.com/FiosForHome/Channels/fios/FiosTV_comingsoon.aspx.
http://www.iptvnews.net/.
http://www.att.com/Common/files/pdf/IPvideonetwork.pdf.
A. Adams, J. Nicholas, and W. Siadak, "Protocol Independent Multicast—Dense Mode (PIM-DM): Protocol Specification (revised)," IETF RFC 3973, 2005.
D. Estrin, Ed., "Protocol Independent Multicast—Sparse Mode (PIM-SM): Protocol Specification", IETF RFC 2362, 1998.
S. Bhattacharyya, Ed., "An overview of Source-Specific Multicast (SSM)," IETF RFC 3569, 2003.
E. Rosen, A. Viswanathan, and R. Callon, "Multiprotocol Label Switching architecture," IETF RFC 3031, 2001.
P. Pan, G. Swallow, and A. Atlas (Editors), "Fast reroute extensions to RSVP-TE for LSP tunnels," IETF RFC 4090, 2005.

(Continued)

*Primary Examiner* — Ricky Ngo
*Assistant Examiner* — Christine Ng
(74) *Attorney, Agent, or Firm* — Toler Law Group, PC

(57) ABSTRACT

Systems and methods of multicast configuration are provided. A particular method includes detecting a failure in the data network at a first node of a data network. The method also includes determining an alternate route from the first node to a data source of the data network. The alternate route includes a second node as an upstream node. The method further includes determining whether the alternate route would create a loop in the data network. The method includes setting a state of the first node to a waiting-to-join the second node state when the alternate route would create a loop.

21 Claims, 11 Drawing Sheets

OTHER PUBLICATIONS

Cisco document, "MPLS traffic engineering fast reroute: Link protections," http://www.cisco.com.

J. Moy, "OSPF Anatomy of an Internet Routing Protocol", Addison Wesley, 2000.

M. Cha, W. A. Chaovalitwongse, Z. Ge, J. Yates, and S. Moon, "Path protection routing with SRLG constraints to support IPTV in WDM mesh networks," Proc. of IEEE Global Internet Symposium, 2006.

P. Francois, C. Filsfils J. Evans and O. Bonaventure, "Achieving subsecond IGP convergence in large IP networks," ACM SIGCOMM Computer Communication Review, 35(3), pp. 35-44, Jul. 2005.

K.N. Oikonomou, R.K. Sinha, R.D. Doverspike, Multi-layer network performance and reliability analysis, The International Journal of Interdisciplinary Telecommunications & Networking (IJITN) (in press).

D. Velten, R. Hiden, and J. Sax, "Reliable Data Protocol (RDP)," IETF RFC 908, 1984.

W. Tan and A. Zakhor, "Video multicast using layered FEC and scalable compression," IEEE Transactions on Circuits and Systems for Video Technology, 11(3), pp. 373-386, 2001.

Y. Xiong and L. Mason, "Restoration strategies and spare capacity requirements in self-healing ATM networks," IEEE/ACM Transactions on Networking, 7(1), pp. 98-110, 1999.

K. Nahrstedt and R. Steinmetz, "Multimedia Fundamentals, vol. 1: Media Coding and Content Processing", 2nd Ed. Prentice Hall, 2002.

B. Quinn, K. Almeroth, "IP multicast applications: Challenges and solutions," IETF RFC 3170, 2001.

M. Handley et al, "The reliable multicast design space for bulk data transfer," IETF RFC 2887, 2000.

M. Cha, S. Moon, C.-D. Park and A. Shaikh, "Placing relay nodes for intra-domain path diversity," Proc. of IEEE INFOCOM, Apr. 2006.

G. Li, D. Wang, and R. Dovespike, "Efficent distributed MPLS P2MP fast reroute," Proc. of IEEE INFOCOM, Apr. 2006.

R. Braden (Ed.), L. Zhang, S. Berson, S. Herzog, and S. Jamin, "Resource ReSerVation Protocol (RSVP)—version 1 functional specification," IETF RFC 2205, 1997.

S. Lee, Y. Yu, S. Nelakuditi, Z-L. Zhang, and C.-N. Chuah, "Proactive vs. reactive approaches to failure resilient routing," Proc. of IEEE INFOCOM, Mar. 2004.

M. Goyal, K. K. Ramakrishnan, and W.-C. Feng, "Achieving faster failure detection in OSPF networks," Proc. of IEEE ICC, May 2003.

The Network Simulator, ns-2. http://www.isi.edu/nsnam/ns.

G. Ahn and W. Chun, "Design and implementation of MPLS network simulator supporting LDP and CR-LDP," Proc. of IEEE ICON, 2000.

C.-C. Wen, C.-S. Wu, and K.J. Chen, "Centralized Control and Management Architecture Design for PIM-SM Based IP/MPLS Multicast Networks," Proc. of IEEE GLOBECOM, 2007.

* cited by examiner

```
# M_{1×N} – list of (S_i,G_i)s the node is subscribed to
# oiflist[S,G] – list of downstream interfaces for (S,G)
# current_iif[S,G] – list of current upstream interfaces
# new_iif[S,G] – list of new upstream interfaces for
#                those (S,G)s on transient state
# uplink_changed[S,G] – true for (S,G) in transient state
# pending_join[S,G] – true when waiting to send a join
# pending_join_iif[S,G] – interface on which a pending join to be sent

# IGP routing interfaces have changed
void notify()
        for i = 1 to N
            (S,G) ← M_i
            # obtain the new iif for S
            new_iif[S,G] ← IGP(S)
            if current_iif[S,G] != new_iif[S,G] then
                    # if the new upstream node is among the current
                    # downstream ones, then delay the join
                    if new_iif[S,G] oiflist[S,G] then
                            pending_join[S,G] ← true
                            pending_join_iif[S,G] ← new_iif[S,G]
                            return
                    end if
                    # indicate the transient state on (S,G)
                    uplink_changed[S,G] ← true
                    join(S,G)
            end if
        end for
```

FIG. 14

\# $M_{1 \times N}$ – list of $(S_i, G_i)$s the node is subscribed to
\# *oiflist*[S,G] – list of downstream interfaces for (S,G)
\# *current_iif*[S,G] – list of current upstream interfaces
\# *new_iif*[S,G] – list of new upstream interfaces for
\#                       those (S,G)s on transient state
\# *uplink_changed*[S,G] – true for (S,G) in transient state
\# *pending_join*[S,G] – true when waiting to send a join
\# *pending_join_iif*[S,G] – interface on which a pending join to be sent \# Data packet for (S,G) was received on a wrong upstream interface *iif*
void handle-wrong-iif(S, G, *iif*)
    \# if the node is on transient state for (S,G) and you
    \# have been expecting data packets on *iif*
    if *uplink_changed(S,G)* AND *new_iif*[S,G] = *iif* then
        *uplink_changed*[S,G] ← false
        \# send prune to the old upstream interface
        *send-prune(S,G, current_iif*[S,G])
        \# install the new upstream interface
        *change-iif(S,G,current_iif*[S,G],*new_iif*[S,G])
        *current_iif*[S,G] ← *new_iif*[S,G]
    end if

\# Data packet for (S,G) was received on a wrong upstream interface *iif*
void recv-prune(S, G, *iface*)
    if *pending_join*[S,G] AND *iface* = *pending_join_iif*[S,G] then
        *pending_join*[S,G] ← false
        *uplink_changed*[S,G] ← true
        *join(S,G)*
    end if
    \# Continue the regular processing of prune

FIG. 15

SYSTEMS AND METHODS OF MULTICAST RECONFIGURATION USING CROSS-LAYER INFORMATION

FIELD OF THE DISCLOSURE

The present disclosure is generally related to systems and methods of routing to provide robust restoration using cross-layer information for multicast traffic.

BACKGROUND

Television and other media service providers can provide media services to multiple households. As service areas become larger, the network infrastructure may be expanded. Nonetheless, distributing multimedia content, especially television content or other video content, via a network typically requires high bandwidth combined with techniques to achieve tight latency and loss constraints, even under failure conditions. If a component in such a network fails, continuing to distribute media content via the network often requires identification and repair of the failure; re-routing of data packets around the point of failure; re-generating data packets at a head-end device; or other solutions. Some faults can cause network congestion, packet loss or other delays in data traffic. Simple re-routing techniques to achieve restoration from one or more concurrent failures may also cause network congestion and packet loss. Multiple network failures can compound these effects, which can significantly impact the quality of media content delivery.

BRIEF DESCRIPTION OF THE DRAWINGS

FIG. 14 is a diagram of a first particular embodiment of pseudo-code to perform a cross-layer multicast reconfiguration; and FIG. 15 is a diagram of a second particular embodiment of pseudo-code to perform a cross-layer multicast reconfiguration.

DETAILED DESCRIPTION

Systems and methods of routing data are provided. In a particular embodiment, a method includes detecting a failure in the data network at a first node of a data network that multicasts information to multiple nodes. The method also includes determining an alternate route from the first node to a data source of the data network. The alternate route includes a second node as an upstream node in the multicast tree rooted at the data source. The method further includes determining whether the alternate route would create a loop in the data network. The method includes setting a state of the first node to a waiting-to-join the second node state when the alternate route would create a loop.

In another particular embodiment, a system includes a first network node. The first network node includes a network interface to receive data from one or more upstream nodes of a data network and to send the data to one or more downstream nodes of the data network based on a multicast tree. The first network node also includes a routing module coupled to the network interface. The routing module to determine the multicast tree based on cost values associated with links of the data network from a data source to the first network node. When the routing module determines a new multicast tree, the routing module determines whether the new multicast tree would create a loop in the data network. The loop may be detected by comparing the old upstream interface to the new upstream interface. When the old upstream interface and the new upstream interface are the same, the new multicast tree creates a loop when installed. When the new multicast tree would create a loop in the data network, the routing module stores a data record indicating a state of waiting-to-join a second network node. When there is no possibility of a loop, the waiting-to-join state does not need to be used. The second network node is an upstream node of the first network node in the new multicast tree.

Another particular embodiment includes a computer-readable medium. The computer-readable medium includes instructions that, when executed by a processor, cause the processor to determine an alternate route from a first node to a data source of a data network in response to an identified failure in the data network. The alternate route includes a second node as an upstream node. The computer-readable medium includes instructions that, when executed by the processor, cause the processor to determine whether the alternate route would create a loop in the data network. The computer-readable medium further includes instructions that, when executed by the processor, cause the processor to set a state of the first node to waiting-to-join the second node when the alternate route would create a loop.

Figure 1:
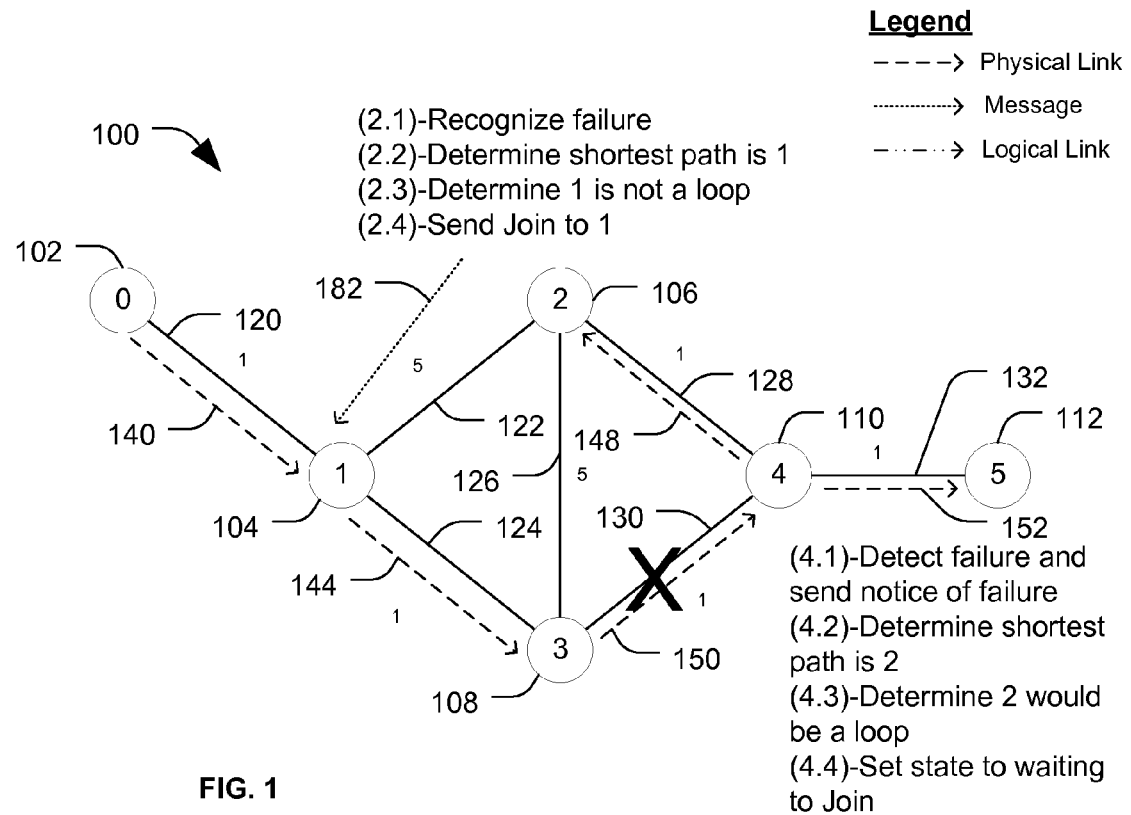
FIG. 1 is a data flow diagram of a first illustrative state of a data network of a first particular embodiment.

FIG. 1 depicts a data flow diagram of a first illustrative state of a first particular embodiment of a data network 100. The data network 100 includes a plurality of network nodes, such as a source node 102, a first node 104, a second node 106, a third node 108, a fourth node 110, and a fifth node 112. The plurality of network nodes 102-112 are connected via a plurality of data connections. For example, the source node 102 is connected to the first node 104 via a first data connection 120; the first node 104 is connected to the second node 106 via a second data connection 122; the first node 104 is connected to the third node 108 via a third data connection 124; the third node 108 is connected to the second node 106 via a fourth data connection 126; the third node 108 is connected to the fourth node 110 via a fifth data connection 130; the second node 106 is connected to the fourth node 110 via a sixth data connection 128; and the fourth node 110 is connected to the fifth node 112 via a seventh data connection 132. The data connections 120-132 include physical communication media (such as optical fibers, wires, etc.) or other communication media (such as wireless transmission media). For the sake of simplicity, the data connections 120-132 are each illustrated as a single line. The data connections 120-132 may be referred to as physical links. However, each of the data connections 120-132 may include two unidirectional portions. A downstream portion may connect a particular node and another node toward which the particular node forwards data traffic. An upstream portion may connect the particular node and another node from which the particular node receives data traffic. For example, the third data connection 124 may include a downstream portion adapted to carry data from the first node 104 to the third node 108 and an upstream portion to carry data from the third node 108 to the first node 104. When the data connections 120-132 include two unidirectional portions, data traffic sent via the upstream portion does not overlap with or otherwise interfere with data traffic sent via the downstream portion.

In a particular embodiment, the source node 102 and the plurality of network nodes 104-112 communicate with each other via a plurality of links 140-152. In a particular embodiment, the network nodes and the links 140-152 form a multimedia Internet Protocol (IP) backbone network to distribute Internet Protocol Television (IPTV) content from an IPTV service provider to various subscribers. The links 140-152 can be adapted to transmit data according to various protocols such as Packet-over-SONET (POS), IP-over-Ethernet, IP-over-ODU (ITU signals), or other transport protocols and technologies. In a multicast tree, where the network nodes 102-112 are interconnected in a tree-like topology (referred to herein as a "routing tree"), it is desirable that each network node receives only one copy of each data packet sent from the source node 102, and that a data packet traverses a link only once.

In a particular embodiment, the source node 102 can be a video head-end, such as a super, national or regional video head-end. The source node 102 can include one or more satellite receivers, data servers, or other systems that receive media content, such as video content, audio content, or any combination thereof, from one or more content providers. Moreover, the source node 102 can include a plurality of routers. In an illustrative embodiment, the source node 102 can include one router per IPTV channel served to media destinations, such as subscriber homes. The source node 102 can send data including media content to the media destinations via IP communication using a Moving Pictures Experts Group (MPEG) stream or other packet-based mechanism suitable to send the media content. In an illustrative, non-limiting embodiment, the source node 102 can include devices and systems, such as a low-noise block-down converter and other systems, to convert a satellite signal to packet data.

Each of the network nodes 102-112 may function as a media distribution node that receives media data packets. The media data packets may include video content, audio content, or any combination thereof The network nodes 102-112 may multicast the received media data packets to various serving areas that may include regional or sub-regional network nodes, set-top box devices at subscriber homes, or any combination thereof In a particular embodiment, each of the network nodes 102-112 includes one or more servers, multicast-enabled routers, or other devices, each of which can include interfaces, logic (e.g., one or more processors), memory devices, other components, or any combination thereof, adapted to perform one or more of the functions described herein, such as receiving a data packet, sending a data packet, storing data, determining one or more network paths, and other functions.

Routers at the network nodes 102-112 can send data packets, such as video packets, associated with media content, to each other via the links 140-152. The links 140-152 are logical links that are layered on top of the physical links 120-132. The links 140-152 may be referred to as "pseudo-wires." The links 140-152 may have associated backup paths. The flow of data through the data network 100 can be represented as a multicast tree (or "routing tree"), such as a source-specific multicast tree having a router at the source node 102 as its root. The multicast tree indicates an order in which the network nodes 104-112 receive copies of each data packet sent by a router at the source node 102 and is not necessarily the same as the sequence in which the network nodes 104-112 are physically connected to the source node 102 via the data connections 120-132. The data network 100 may be represented as a multicast tree because the data network 100 does not include any loops.

FIG. 1 illustrates links of an initial or existing multicast tree of the data network 100 as dashed lines. For example, the existing multicast tree includes a first link 140 between the source node 102 and the second node 104, a second link 144 between the first node 104 and the third node 108, a third link 150 between the third node 108 and the fourth node 110, a fourth link 148 between the fourth node 110 and the second node 106; and a fifth link 152 between the fourth node 110 and the fifth node 112. The physical link 120 has a link weight of 1, the physical link 124 has a link weight of 1, the physical link 130 has a link weight of 1, the physical link 128 has a link weight of 1, and the physical link 132 has a link weight of 1. The link weights are for both directions of the physical links 120-132. The links 140, 144, 148, 150, and 152 that constitute the multicast tree are based on the corresponding physical links 120, 124, 128, 130, and 132 that have a low weight (e.g. 1). The physical links 122 and 126 do not have corresponding links in the multicast tree because they each have a high link weight (e.g. 5). The third data connection 122 and the fourth data connection 126 may be used as backup connections in case of a failure of another data connection or network node.

The initial multicast tree is determined based on a plurality of primary paths associated with the data network 100. Each primary path is associated with one of the links 140-152 and indicates a direction of downstream data travel between two network nodes. In a particular embodiment, the primary paths on which the multicast tree is based can be determined by the network nodes 102-112. Each of the network nodes 102-112 can select an initial primary path to a downstream network node (i.e. a "next hop node"), based on link bandwidth costs (e.g., an available bandwidth or inverse of available bandwidth) or other link weighting factors associated with the network links to which the network node is coupled. The multicast tree may represent the shortest paths in the upstream direction from each of the nodes 104, 106, 108, 110, and 112 back to the router 102 of the source node.

For example, if a link weighting factor associated with a link between the first node 104 and the third node 108 is equal to 1, and a link weighting factor associated with a link between the first node 104 and the second node 106 is equal to 5, then the first node 104 can select the third node 108 as the next hop node. Consequently, the initial multicast tree associated with the data network 100 can include an initial primary path directed from the first node 104 to the third node 108 via the second link 144. Examples of primary paths associated with an initial multicast tree are illustrated in FIG. 1 as the links 140-152. In a particular embodiment, the network nodes 102-112 are adapted to select low cost links in determining a next hop node. In another particular embodiment, the network nodes 102-112 are adapted to select high cost links in determining the next hop node.

In a particular embodiment, a Protocol-Independent Multicast (PIM) protocol, such as PIM Sparse Mode (PIM-SM) or PIM Source Specific Multicast (PIM-SSM), can be used to determine the initial multicast tree based on the plurality of initial primary paths associated with the data network 100, such that the initial multicast tree includes the low cost links of the data network 100. The topological state of the data network 100 can be maintained via an interior gateway protocol (IGP), such as an open shortest path first (OSPF) protocol, OSPF version 3 (OSPFv3) protocol, intermediate system-to-intermediate system (IS-IS) protocol, multicast OSPF (MOSPF) protocol, or other link-state routing protocol, where routers associated with the network nodes 102-112 each store information about the complete network topology and calculate the best next hop to each of the other possible destinations (i.e., connected media destinations) based on link costs or other link weighting factors.

In an illustrative embodiment, each of the routers at the network nodes 102-112 can store a link state database that indicates the entire network topology, as well as a routing table that includes data indicating (a) which nodes of the data network 100 are connected to particular other nodes; (b) the shortest paths to other nodes (such as the root of the multicast tree or a desired parent node); (c) the primary path to a next hop node; or any combination thereof. Additionally, each of the routers can store state information related to a portion of the initial multicast tree that is relevant to the particular router. For example, the state information can include child nodes downstream from the router, and one or more shortest paths from the router to a router at the root of the initial multicast tree (i.e., a router at the source node 102). The router at the network node can determine at least some of the state information based on multicast join messages sent by downstream nodes.

For instance, the router can receive a join message related to a particular IPTV channel from a second router at a next hop node of the data network 100 in response to the next hop node receiving a request for the channel from a set-top box device. When the router is already receiving media packets related to the requested channel, the router can append the primary path from the router to the next hop node to a multicast tree for the channel, which extends from a source router at the source node 102 to the router. When the router is not receiving media packets related to the requested channel, the router can store link state information indicating that it is to send copies of the media packets related to the next hop node. The router can also send a join message toward the source node 102 via a shortest open path determined from its routing table. After the router is appended to the multicast tree for the channel, the router can also append the primary path to the next hop node to the multicast tree for the channel. The state maintained for downstream routers is the same, whether the router is receiving media packets or not. The join is forwarded upstream when this state is newly created. When this state is not newly created, the join is not forwarded upstream.

In a particular embodiment, after the initial multicast tree is determined for the data network 100, a second set of link weighting factors can be determined for the data network 100 and can be distributed to routers at the network nodes 102-112. Using the second set of link weighting factors, each of the network nodes 102-112 can determine and store an initial backup path (i.e. an initial backup path to the primary path, where the primary path is the physical link) to send data packets to a next network node during a link failure. For example, if the physical link 130 associated with an initial primary path between the third node 108 and the fourth node 110 fails due to physical damage of the physical link 130, router line card failures, router mis-configuration, network upgrades or maintenance, or other failure conditions, the third node 108 can send data to the fourth node 110 via the initial backup path (e.g., via fourth data connection 126 and sixth data connection 128).

In a particular embodiment, the initial multicast tree may be determined to meet one or more specified criteria. In a particular embodiment, the criteria may include: (1) that each network node should only receive one copy of each data packet sent from the source node 102; and (2) that no backup path should overlap any primary path of the initial multicast tree. Link weighting factors can be set for the data connections 120-132 and associated links to manipulate selections of one or more of the initial primary paths by each of the network nodes 102-112, such that the resulting initial multicast tree meets the desired criteria.

In one embodiment, link weighting factors can be set by a network management system or network administrator and can be communicated to the routers associated with each of the network nodes 102-112 (e.g., as IGP link weighting factors). In another example, the link weighting factors can be included with router configuration software loaded onto routers at the network nodes 102-112.

In a particular embodiment, when a link or data connection of the data network 100 fails, the network nodes 102-112 implement a re-route method to determine a new multicast tree. Thus, data packets sent via the initial primary path can be re-routed via the backup path. However, a backup path for a link may not result in a new multicast tree. Using the backup path can reduce or eliminate the short-term impact of a link failure on quality of service provided to end users. In an illustrative embodiment, the backup path can be activated by a link-layer fast re-route (FRR) mechanism upon detection of a link failure. This does not result in a new multicast tree—the multicast tree remains unchanged, and only the traffic on the failed link is rerouted over the backup path. In this embodiment, the re-routing of data can take, in some cases, 50 milliseconds or less. When the backup path is activated by link-layer FRR, the backup path is referred to as an FRR link. The utility of the FRR link may be frustrated if additional link failures occur in the data network 100. The multicast tree may be re-configured, resulting in a new multicast tree, to avoid or mitigate the impact of additional link failures. Although multicast tree re-configuration can take up to 10 seconds or more, it enables the data network 100 to avoid relatively long-term dependence on the FRR link. Hence, the FRR link can be used to re-route traffic around a failed link during re-configuration of the multicast tree, and the re-configured multicast tree can then be used to route data traffic without reliance on the failed link or the FRR link.

For example, as illustrated in FIG. 1, the physical link 130 has failed. After detecting the failure of the physical link 130, the fourth node 110 sends a notice of the failure to other nodes of the data network 100. For example, the notice may be a link state advertisement or other notification message sent to indicate to the other nodes that a link, data connection, or network node has failed. The fourth node 110 (and other network nodes that are aware of the failure) may determine a new multicast tree. As illustrated, the fourth node 110 determines that, since the physical link 130 is not available, the shortest (or least cost) path to the source node 102 is through the second node 106. However, since the second node 106 is a downstream node of the fourth node 110 in the existing multicast tree (as illustrated by fourth link 148) the new multicast tree determined by the fourth node 110 would create a loop in the data network 100. That is, the second node 106 would be both an upstream node (sending data to) and a downstream node (receiving data from) of the fourth node 110.

As discussed above, the network nodes 102-112 may be adapted to avoid creating loops in the data network 100. For example, after a particular network node receives a join message from another network node, the particular network node may determine whether the other node is an upstream node of the particular network node in the data network 100. When the other node is an upstream node of the particular node, a loop would be created if the particular node accepted the join message. Accordingly, the join message may be discarded. To illustrate, if the fourth node 110 sends a join message to the second node 106, the second node 106 will reject the join message to avoid creating a loop in the data network 100 because the fourth node 110 is an upstream node of the second node 106. In a particular embodiment, to avoid this outcome, the fourth node 110 sets itself, for this multicast channel, to a waiting-to-join state. The waiting-to-join state indicates that, when it would not create a loop in the data network 100, the fourth node 110 should join the second node 106.

Additionally, as illustrated in FIG. 1, the second node 106 may, through IGP link state advertisements, eventually recognize that there has been a failure in the data network 100. For example, the second node 106 may receive a notice of the failure from the fourth node 110 or the third node 108 or the first node 104, depending on the delays in IGP routing calculation progress and timers. To illustrate, the link state advertisements may be sent from the node adjacent to the failure (nodes 108 or 110) after recognizing the failure and do not have to wait for the IPG route calculation to be completed. In addition, there may be timers affecting suppression of the link state advertisements. In response to recognizing the failure, the second node 106 may determine a new multicast tree. For example, the second node 106 may determine a shortest or least cost path to the source node 102. In the particular embodiment illustrated, the least cost path to the source node 102 for the second node 106 is via the first node 104. The second node 106 may also determine whether implementing the new multicast tree would create a loop in the data network 100. In this case, since the second node 106 would be a downstream node of first node 104, the second node 106 determines whether the first node 104 is an upstream node in the data network 100. The first node 104 is not an upstream node of the second node 106, so the second node 106 sends a join message 182 to the first node 104.

In a variation of the above example, the multicast tree may be reconfigured without using the "waiting-to-join" state. One or more temporary loops and packet loss may occur when the multicast tree is reconfigured without using the "waiting-to-join" state. For example, the fast re-route capability of Multi-Protocol Label Switching (MPLS) may be used to re-route traffic around a failed link. A message, such as an OSPF message at Layer 3, may be sent to indicate the state of the failed link. After re-computing a new path to the source, the node downstream of the failed link may send a join message upstream towards the source over the newly computed path to the source to build a new tree from the source to the nodes downstream of the failed link, without using the "waiting-to-join" state. Thus, the multicast tree may be reconfigured even though there may be transient loops. An advantage of reconfiguring the multicast tree without using the "waiting-to-join" state may be to provide limited protection against a subsequent (i.e. second) failure (since it will work reasonably only in situations where there is limited potential for transient loops or packet loss.) An additional timer that delays the transmission of the join rather than waiting to receive data from a new downstream node may also be used to avoid transient loops or packet loss. However, this timer would have to be set conservatively to a large value.

Figure 2:
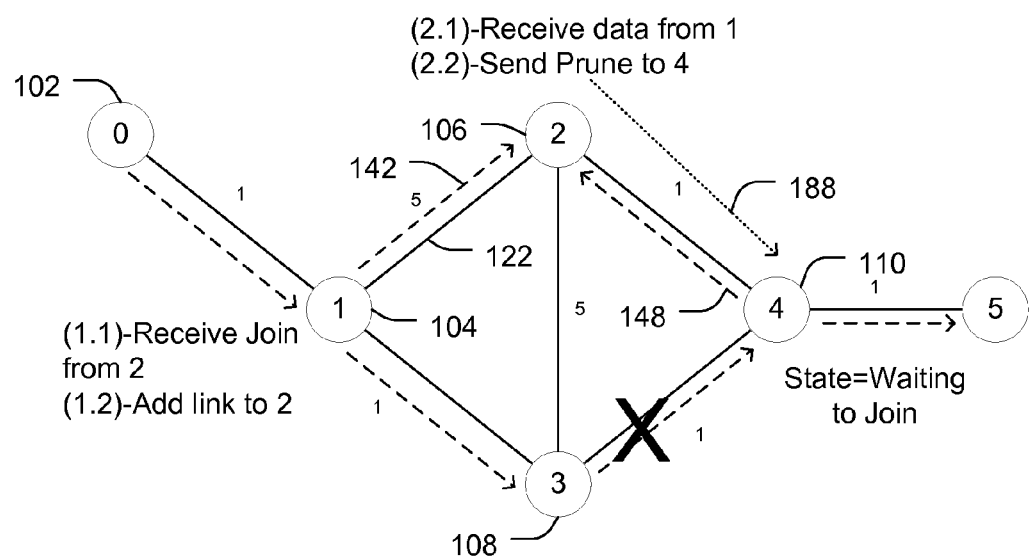
FIG. 2 is a data flow diagram of a second illustrative state of the data network of the first particular embodiment.

FIG. 2 depicts a data flow diagram of a second illustrative state of the data network 100 of the first particular embodiment. After receiving the join message 182 from the second node 106 (as illustrated in FIG. 1), the first node 104 may add a sixth (logical)) link 142 to the second node 106 as a downstream node in the multicast tree. Adding a link to a node refers to adding the node as a next hop node to a multicast routing table of one or more routers for that multicast group. The first node 104 may send data to the second node 106 via the sixth link 142.

In a particular embodiment, the network nodes 102-112 are adapted to remove existing links only after they have been replaced with new links and data has been received via the new links. Thus, after receiving data from the first node 104 via the sixth link 142, the second node 106 may send a prune message 188 to the fourth node 110 to prune the fourth link 148.

Figure 3:
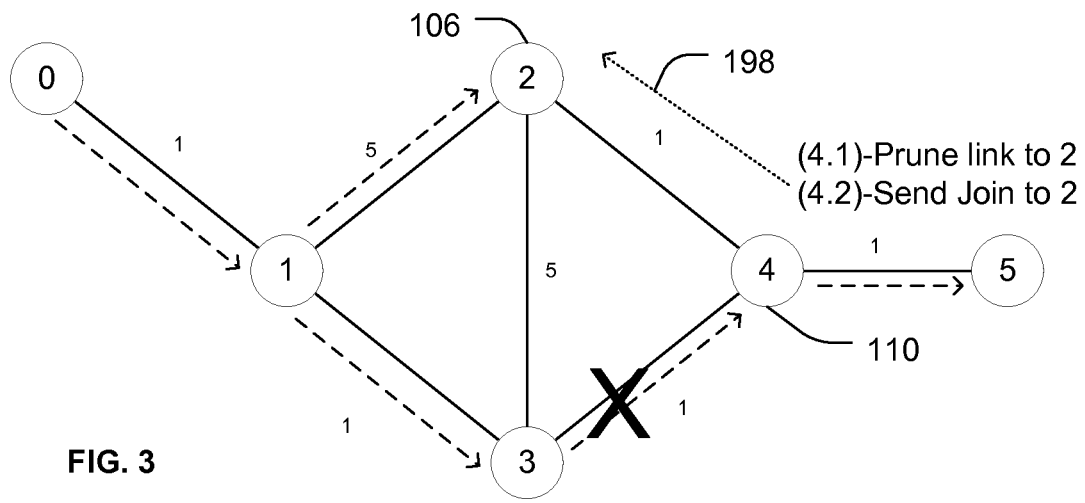
FIG. 3 is a data flow diagram of a third illustrative state of the data network of the first particular embodiment.

FIG. 3 depicts a data flow diagram of a third illustrative state of the data network 100 of the first particular embodiment. After receiving the prune message 188 from the second node 106, the fourth node 110 prunes the fourth link 148 of the multicast tree. Pruning a link to a particular node refers to removing or modifying an entry of a multicast routing table that indicates that the particular node is a next hop node. Additionally, the fourth node 110 determines that the waiting-to-join state is set, indicating that the fourth node 110 is waiting-to-join the second node 106 as an upstream node. After the fourth link 148 is pruned, the fourth node 110 determines that joining the second node 106 would no longer create a loop (because there are no receivers downstream on that link 128) in the data network 100. Therefore, the fourth node 110 sends a join message 198 to the second node 106 to implement the new multicast tree.

Figure 4:
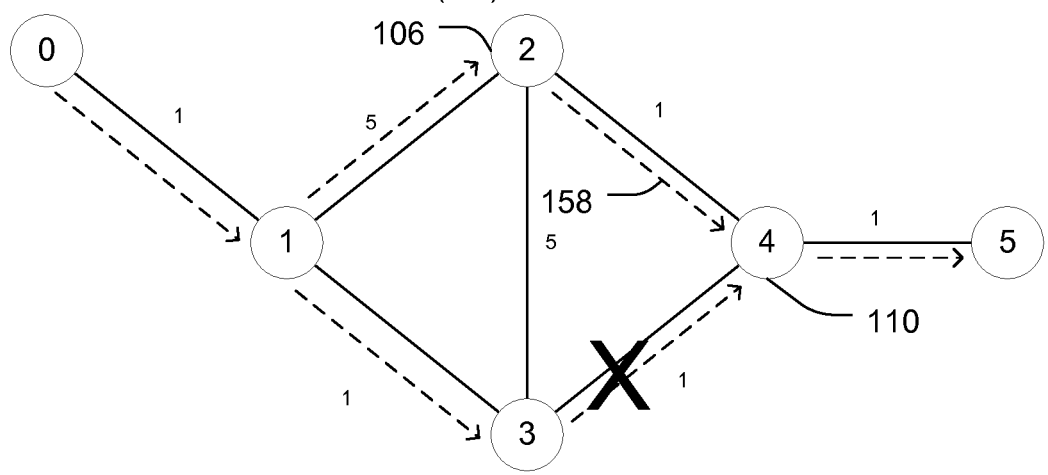
FIG. 4 is a data flow diagram of a fourth illustrative state of the data network of the first particular embodiment.

FIG. 4 depicts a data flow diagram of a fourth illustrative state of the data network 100 of the first particular embodiment. After receiving the join message 198 from the fourth node 110 (as illustrated in FIG. 3), the second node 106 adds a seventh link 158 to the fourth node 110 as a downstream node. With the addition of the seventh link 158, the new multicast tree has been fully implemented.

Figure 5:
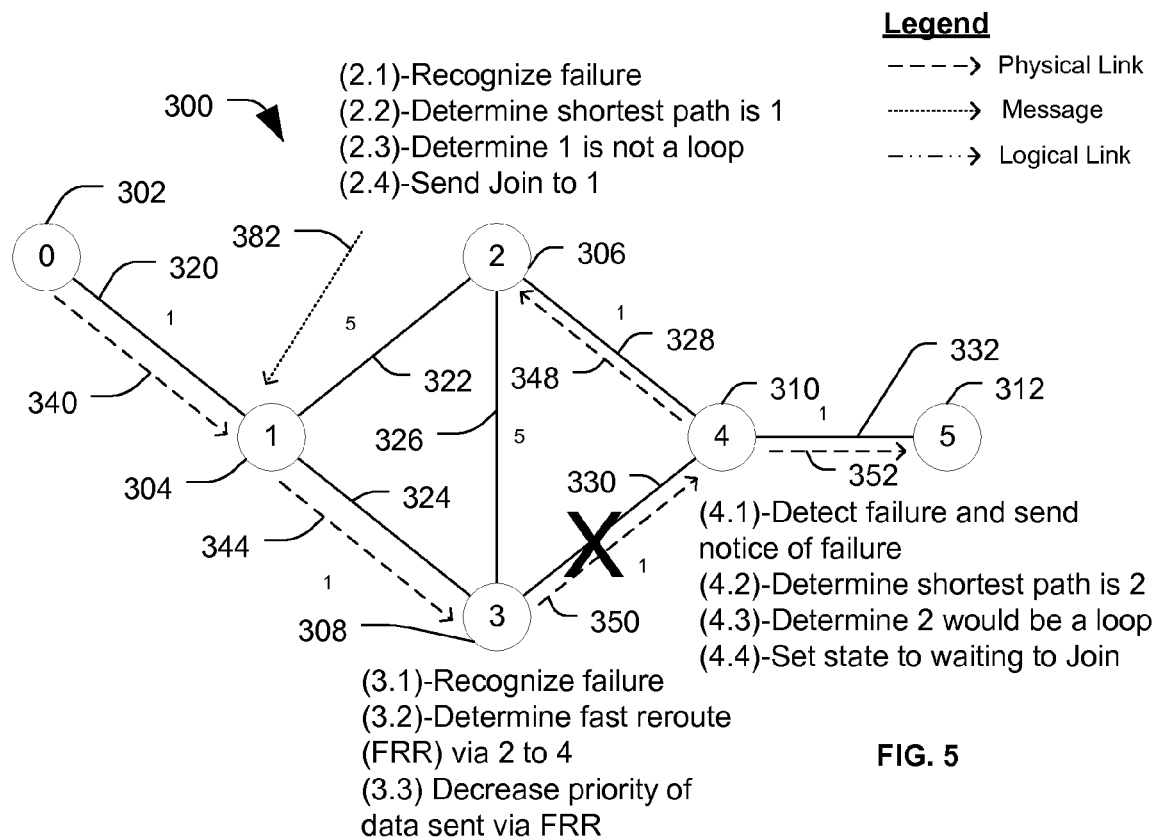
FIG. 5 is a data flow diagram of a first illustrative state of the data network of a second particular embodiment.

FIG. 5 depicts a data flow diagram of a first state of a data network 300 according to a second particular embodiment. The data network 300 includes a plurality of network nodes, such as a source node 302, a first node 304, a second node 306, a third node 308, a fourth node 310, and a fifth node 312. The plurality of network nodes 302-312 are connected via a plurality of data connections. For example, the source node 302 is connected to the first node 304 via a first data connection 320 (i.e. a physical link); the first node 304 is connected to the second node 306 via a second data connection 322; the first node 304 is connected to the third node 308 via a third data connection 324; the third node 308 is connected to the second node 306 via a fourth data connection 326; the third node 308 is connected to the fourth node 310 via a fifth data connection 330; the second node 306 is connected to the fourth node 310 via a sixth data connection 328; and the fourth node 310 is connected to the fifth node 312 via a seventh data connection 332. The data connections 320-332 include physical communication media (such as optical fibers, wires, etc.) or other communication media (such as wireless transmission media). For the sake of simplicity, the data connections 320-332 are illustrated as a single line; however, each of the data connections 320-332 may include an upstream portion and a downstream portion.

FIG. 5 illustrates links of an initial or existing multicast tree of the data network 300 as dashed lines. For example, the existing multicast tree includes a first link 340 between the source node 302 and the second node 304, a second link 344 between the first node 304 and the third node 308, a third link 350 between the third node 308 and the fourth node 310, a fourth link 348 between the fourth node 310 and the second node 306; and a fifth link 352 between the fourth node 310 and the fifth node 312. The physical links 320, 324, 328, 330, and 332 each have an associated weight of 1. The third data connection 322 and links associated with it are illustrated as having a link weight of 5, as is the fourth data connection 326. Thus, the existing multicast tree does not include links associated with the third data connection 322 and the fourth data connection 326 because of the high weights associated with the data connections 322 and 326. Rather, the third data connection 322 and the fourth data connection 326 may be used as backup connections in case of a failure of another data connection or network node. The source node 302 and the plurality of network nodes 304-314 communicate with each other via the links 340-352.

In a particular embodiment, the network nodes 302-312, the data connections 320-332, and the links 340-352 of FIG. 5 operate in substantially the same manner as the respective network nodes 102-112, data connections 120-132, and links 140-152 discussed with reference to FIG. 1. However, FIGS. 5-9 more particularly illustrate operation of the data network 300 with respect to use of a fast re-route (FRR) mechanism.

As illustrated in FIG. 5, the third link 350 of the data network 300 has failed because, for example, a physical link or a port on a router has failed. After detecting the failure of the third link 350, the fourth node 310 sends a notice of the failure to other nodes of the data network 300. For example, the notice may be a link state advertisement or other notification message sent to indicate to the other nodes that a link, data connection, network node or other component of the data network 300 has failed. The fourth node 310 (and other network nodes that are aware of the failure) may determine a new multicast tree. As illustrated, the fourth node 310 determines that, since the third link 350 is not available, the shortest (or least cost) path to the source node 302 is through the second node 306. However, since the second node 306 is a downstream node of the fourth node 310 in the existing multicast tree (as illustrated by fourth link 348) the new multicast tree determined by the fourth node 310 would create a loop in the data network 300. That is, the second node 306 would be both an upstream node (sending data to) and a downstream node (receiving data from) of the fourth node 310.

The network nodes 302-312 may be adapted to avoid creating loops in the data network 300. For example, after a particular network node receives a join message from another network node, the particular network node may determine whether the other node is an upstream node of the particular network node in the data network 300. When the other node is an upstream node of the particular network node, a loop would be created if the particular node accepted the join message. Accordingly, the join message may be discarded. The fourth node 310 avoids sending the join and instead incorporates the waiting-to-join state for each individual multicast group. To illustrate, if the fourth node 310 sends a join message to the second node 306, the second node 306 will reject the join message to avoid creating a loop in the data network 300 because the fourth node 310 is an upstream node of the second node 306. In a particular embodiment, to avoid this outcome, the fourth node 310 sets a state of a multicast group/session of the fourth node 310 to a waiting-to-join state. The waiting-to-join state indicates that, when it would not create a loop in the data network 300, the fourth node 310 should join the second node 306.

Additionally, as illustrated in FIG. 5, the second node 306, through an IGP link state advertisement, may recognize that there has been a failure in the data network 300. For example, the second node 306 may receive a notice of the failure from the fourth node 310, the third node 308, or the first node 304. In response to recognizing the failure, the second node 306 may determine a new multicast tree. For example, the second node 306 may determine a shortest or least cost path to the source node 302. In the particular embodiment illustrated, the least cost path to the source node 302 for the second node 306 is via the first node 304. The second node 306 may also determine whether implementing the new multicast tree would create a loop in the data network 300. In this case, since the second node 306 would be a downstream node of first node 304, the second node 306 determines whether the first node 304 is an upstream node in the data network 300. The first node 304 is not an upstream node of the second node 306, so the second node 306 sends a join message 382 to the first node 304.

Further, after recognizing the failure of the third link 350, the third node 308 implements an FRR mechanism to create an FRR link via the second node 306 to the fourth node 310. Data routed via the FRR link is referred to herein as FRR data to distinguish it from data routed according to a primary multicast tree. In a particular embodiment, the third node 308 also assigns a decreased transmission priority to the FRR data. The FRR link may be implemented at a link layer rather than at an Internet Protocol (IP) layer. The FRR link serves as a backup link and is transparent to the IP layer. Thus, the FRR data may appear to the fourth node 310 as though it had come from the third node 308 via the third link 350.

Figure 6:
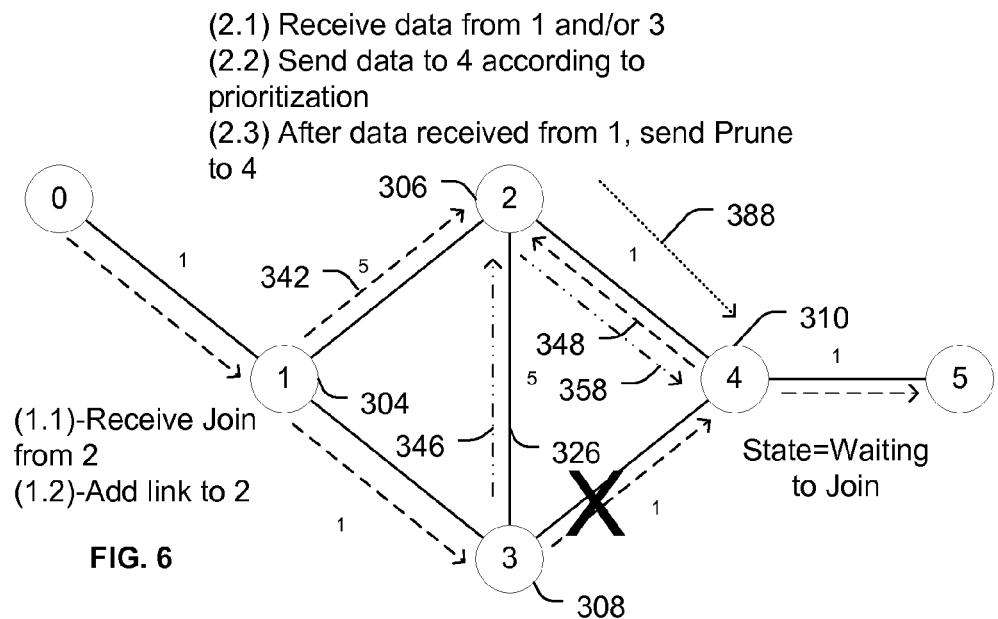
FIG. 6 is a data flow diagram of a second illustrative state of the data network of the second particular embodiment.

FIG. 6 depicts a data flow diagram of a second illustrative state of the data network 300 of the second particular embodiment. The third node 308 has implemented the FRR mechanism to create a backup path from node 308 to node 310 using a first FRR link 346 (routed over the physical link 326) and a second FRR link 358 (routed over the physical link 328) to route data from the third node 308 to the fourth node 310 via the second node 306. The node 306 is not visible at any layer because the FRR path is between the third node 308 and the fourth node 310. The traffic flows through node 306 onto the FRR link 358 (physical link 328). In a particular embodiment, the path over the FRR links 346 and 358 may be created first, enabling traffic to be quickly re-routed when the third link 350 failed is lost. For example, the rerouting of the traffic over the path over the FRR links 346 and 358 may be established within about 50 milliseconds or less.

After receiving the join message 382 from the second node 306 (as illustrated in FIG. 5), the first node 304 may add a sixth link 342 to the second node 306 as a downstream node. The first node 304 may send data to the second node 306 via the sixth link 342. Thus, the second node 306 may receive data packets from the first node 306 via the sixth link 342, from the third node 308 via the first FRR link 346, or both, creating overlap that may result in packet loss. The data packets received via the multicast tree (i.e., the data packets received from the first node 304 via the sixth link 342) may have a first transmission priority, and the data packets of the FRR data (i.e., data packets received from the third node 308 via the first FRR link 346) may have a second transmission priority. In a particular embodiment, the second transmission priority is lower than the first transmission priority. The second node 306 may send a particular data packet to the fourth node 310 based on the transmission priority of the particular data packet. Since data packets of the FRR data may be assigned a lower transmission priority, regular data packets (i.e., data packets received via the multicast tree) may be transmitted at a higher priority than the data packets of the FRR data (i.e. when congestion occurs, FRR packets may be dropped).

The network nodes 302-312 of the data network 300 may be adapted to remove existing links only after they have been replaced with new links and data has been received via the new links. Thus, after receiving data from the first node 304 via the sixth link 342, the second node 306 may send a prune message 388 to the fourth node 310 to prune the fourth link 348.

Figure 7:
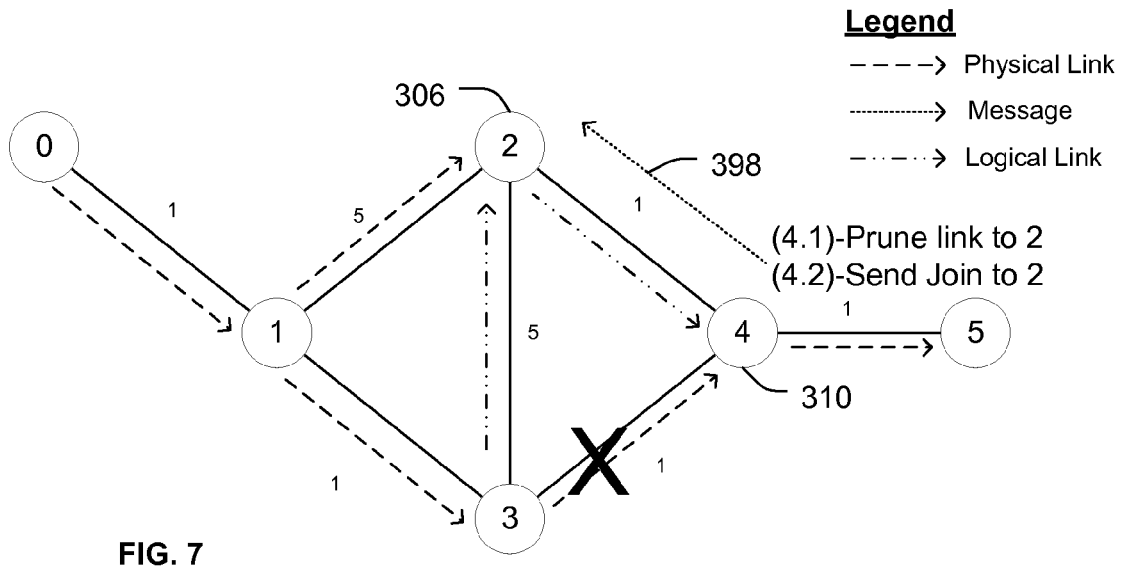
FIG. 7 is a data flow diagram of a third illustrative state of the data network of the second particular embodiment.

FIG. 7 depicts a data flow diagram of a fourth illustrative state of the data network 300 of the second particular embodiment. After receiving the prune message 388 from the second node 306, the fourth node 310 prunes the fourth link 348 to the second node 306 (as illustrated in FIG. 6). Additionally, the fourth node 310 determines that the waiting-to-join state is set, indicating that the fourth node 310 is waiting-to-join the second node 306 as an upstream node. After the fourth link 348 is pruned, the fourth node 310 would not create a loop in the data network 300 by joining the second node 306. Therefore, the fourth node 310 sends a join message 398 to the second node 306 to implement the new multicast tree.

Figure 8:
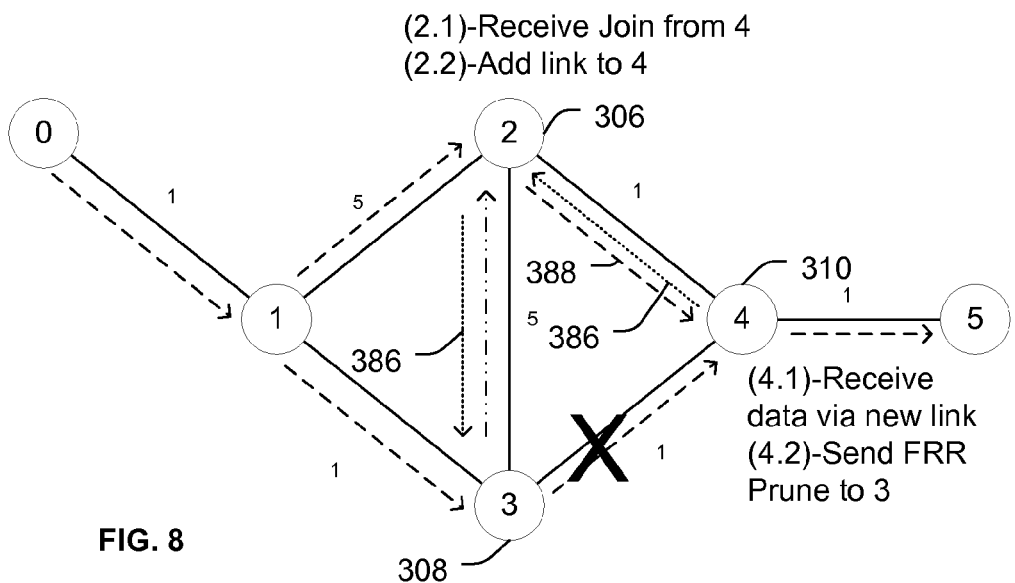
FIG. 8 is a data flow diagram of a fourth illustrative state of the data network of the second particular embodiment.

FIG. 8 depicts a data flow diagram of a fifth illustrative state of the data network 300 of the second particular embodiment. After receiving the join message 398 from the fourth node 310 (as illustrated in FIG. 7), the second node 306 adds a seventh link 388 to the fourth node 310 as a downstream node. With the addition of the seventh link 388, the new multicast tree has been fully implemented. After receiving data from the second node 306 via the seventh link 358, the fourth node 310 may send a prune message 386 to the third node 308 to discontinue the use of the FRR links for carrying the traffic. The prune message 386 travels to the third node 308 through a reverse FRR path (not shown).

Figure 9:
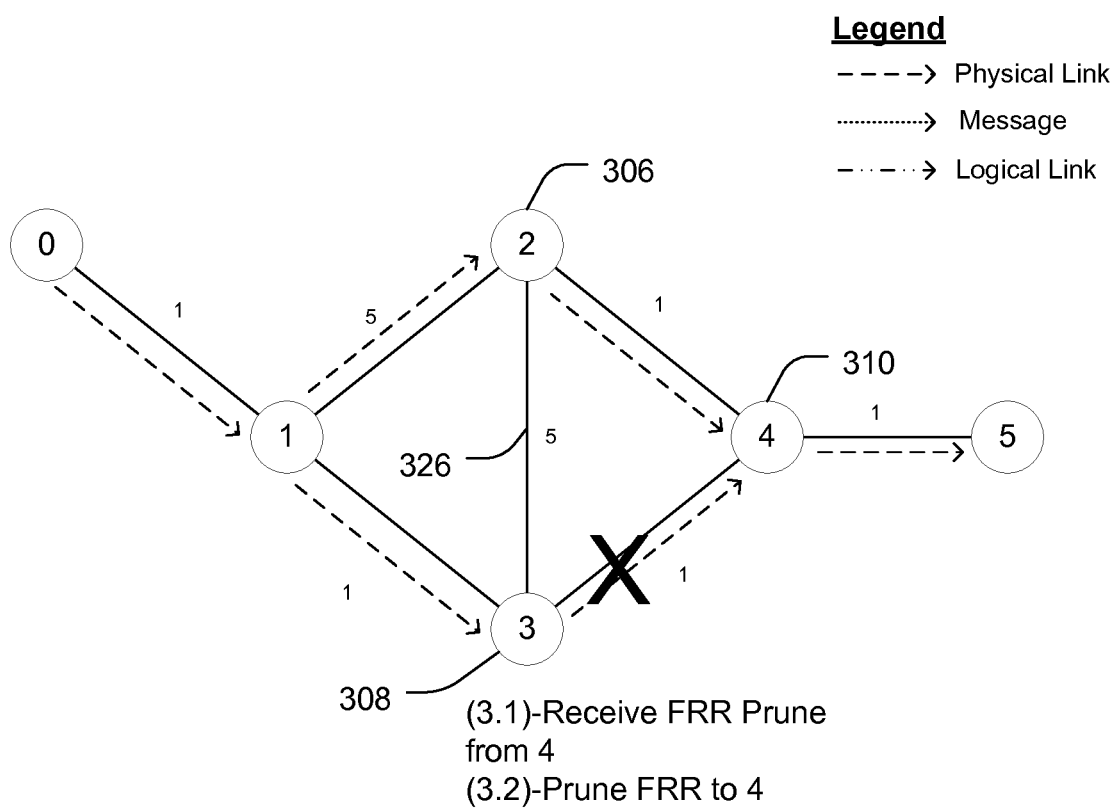
FIG. 9 is a data flow diagram of a fifth illustrative state of the data network of the second particular embodiment.

FIG. 9 depicts a data flow diagram of a sixth illustrative state of the data network 300 of the second particular embodiment. After receiving the FRR prune message 386 from the fourth node 310 (as illustrated in FIG. 8), the third node 308 prunes the multicast tree going over the FRR path.

Figure 10:
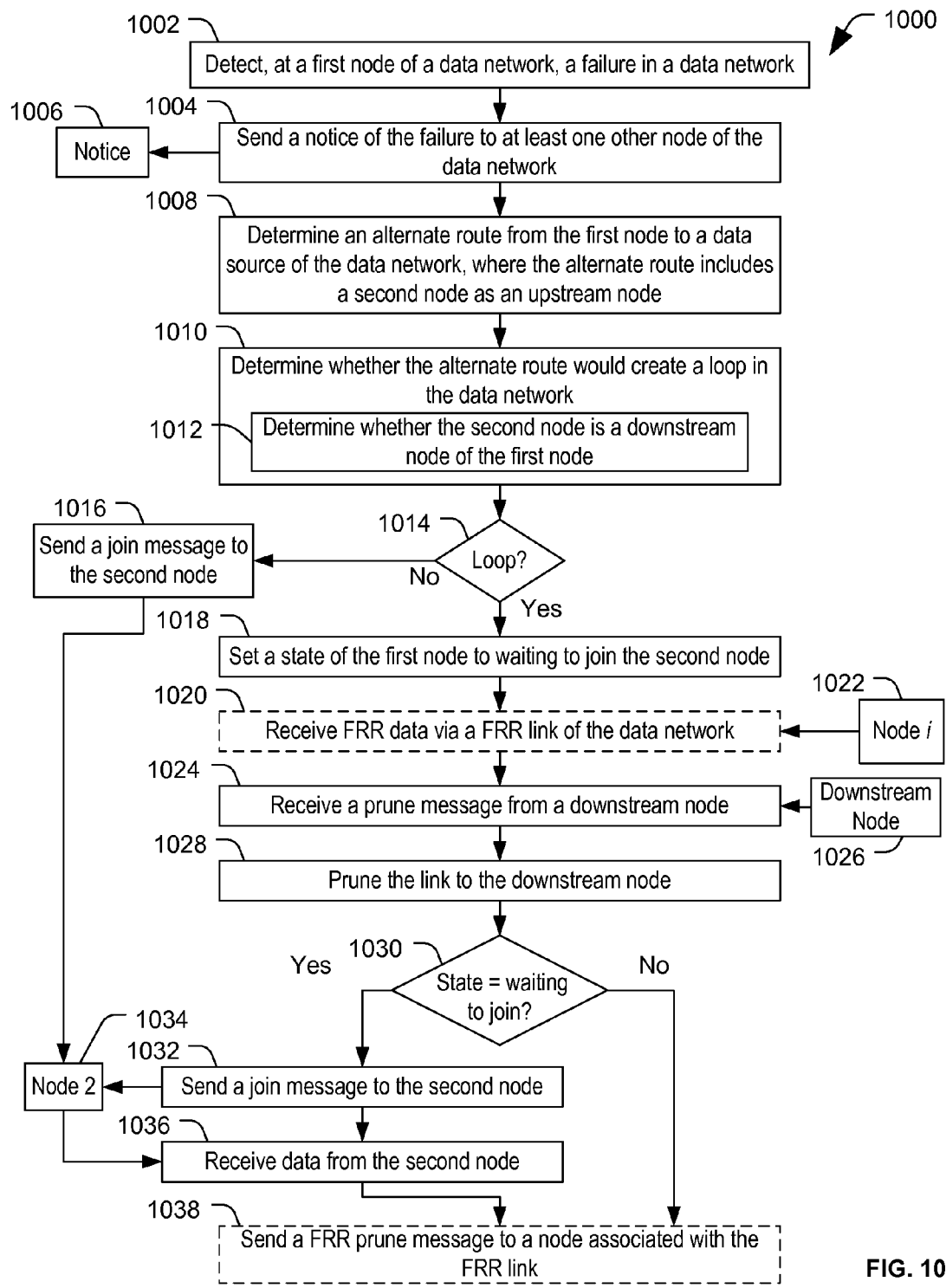
FIG. 10 is a flow chart of a first embodiment of a method of cross-layer multicast reconfiguration.

Referring to FIG. 10, a first particular embodiment of a method of cross-layer multicast reconfigurationis illustrated and designated generally 1000. The method 1000 includes, at 1002, detecting a failure in a data network at a first node. For example, the first node may be any of the network nodes illustrated and discussed with reference to FIGS. 1-9. After detecting the failure, the first node may send a notice 1006 of the failure to at least one other node of the data network, at 1004.

The method 1000 also includes, at 1008, determining an alternate route from the first node to a data source of the data network. For example, the data source may include a source node 102 as discussed with reference to FIGS. 1-4, or a source node 302 as discussed with reference to FIGS. 5-9, or a data source 1404 as discussed with reference to FIG. 12. The alternate route includes a second node 1034 as an upstream node. For example, as discussed with reference to FIG. 1, the alternate route determined by the fourth node 110 included the second node 106 as an upstream node. Returning to FIG. 10, the method 1000 may include, at 1010, determining whether the alternate route would create a loop in the data network. For example, at 1012, the first node may determine whether the second node 1034, which is to be added as an upstream node, is a downstream node of the first node.

At 1014, when the alternate route would not create a loop in the data network, the method includes, at 1016, sending a join message to the second node 1034. When the alternate route would create a loop in the data network, the method includes, at 1018, setting a state of the first node to a waiting-to-join the second node state.

In a particular embodiment, the method 1000 includes, at 1020, receiving fast re-route (FRR) data via a FRR link of the data network. For example, another node 1022 (e.g., "Node i" in FIG. 10) of the data network may recognize the failure of the data network and implement a FRR mechanism to establish the FRR link to the first node.

The method may also include, at 1024, receiving a prune message at the first node from a downstream node 1026. At 1028, in response to the prune message, the first node may prune a link to the downstream node 1026. The method 1000 may also include, at 1030, determining whether the state is set to waiting-to-join the downstream node state. In a particular embodiment, the downstream node 1026 is the second node 1034. That is, while the second node 1034 is an upstream node in the alternate route, it is also a downstream node in an existing multicast tree. When the state is not set to waiting-to-join the downstream node state, the method includes, at 1038, sending a prune message to the upstream node 1022 associated with the FRR link. When the state is set to the waiting-to-join the downstream node state, the method includes, at 1032, sending a join message to the second node 1034 after pruning the link to the downstream node 1026.

The method also includes, at 1036, receiving data from the second node 1034. After at least one data packet is received from the second node 1034, the first node may send a FRR prune message to the node 1022 associated with the FRR link, at 1038. Since the FRR link is pre-established, rerouting of the traffic occurs quickly enough that only in-transit data packets are lost when the failure occurs, and existing links are only pruned after data is received via new links, no data except the in-transit data is lost as a result of the failure.

In a particular embodiment, a "waiting-to-join" state is not used. Instead, the node waits for a predetermined amount of time (e.g. a certain number of seconds) and then sends the join request.

Figure 11:
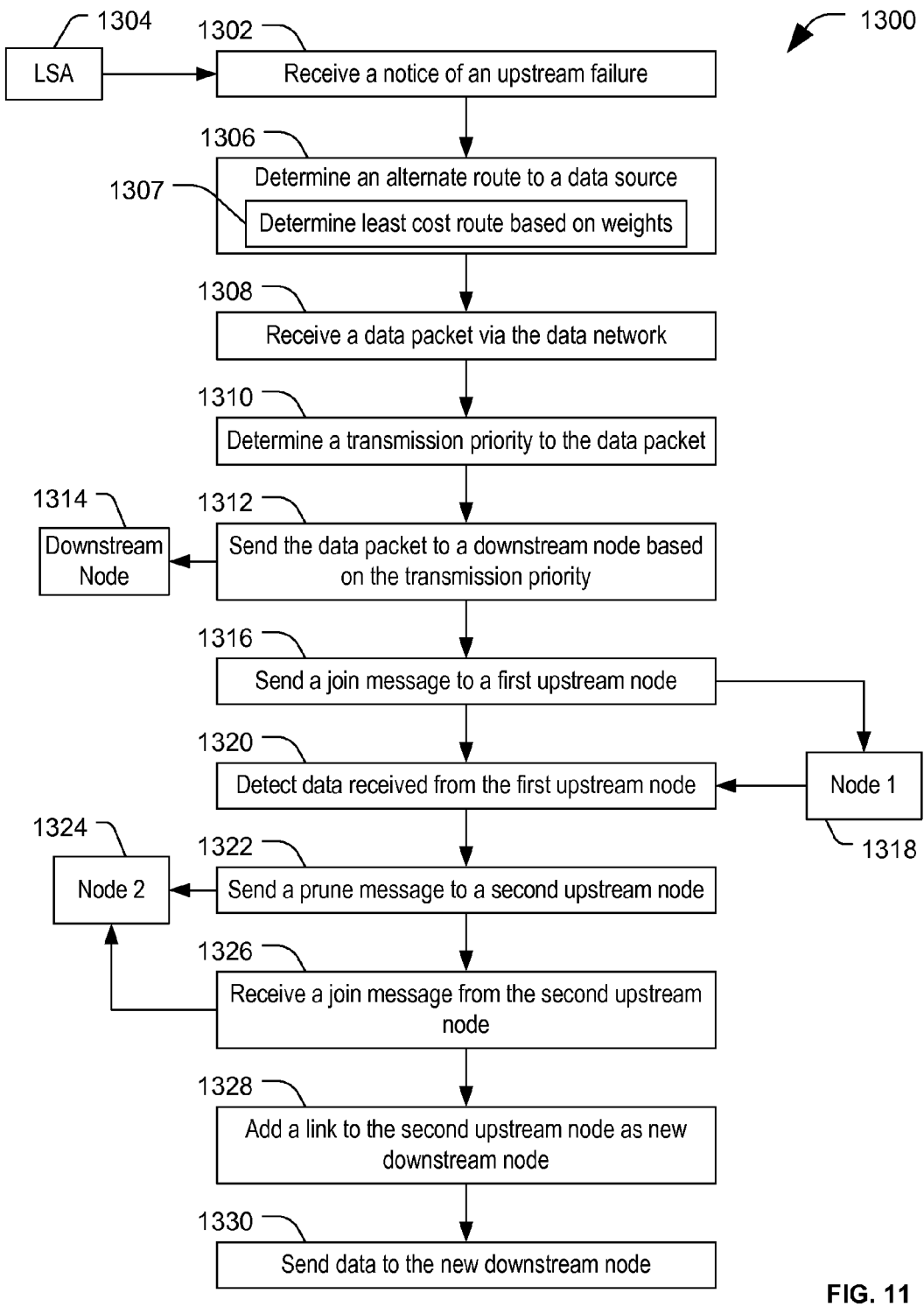
FIG. 11 is a flow chart of a second embodiment of a method of cross-layer multicast reconfiguration.

Referring to FIG. 11, a second particular embodiment of a method of cross-layer multicast reconfiguration is shown, and generally designated 1300. The method 1300 includes, at 1302, receiving a notice 1304 of a failure of a data network. For example, the notice 1304 may include a link state advertisement (LSA). The method 1300 also includes, at 1306, determining an alternate route from a particular node to a data source of the data network.

The method also includes, at 1308, receiving a data packet via the data network, and, at 1310, determining a transmission priority of the data packet. The data packet is sent to a downstream node 1314 based on the transmission priority, at 1312. For example, fast reroute (FRR) data may have a lower transmission priority than other data.

The method 1300 also includes, at 1316, sending a join message to a first upstream node 1318. In response to the join message, the first upstream node 1318 may add a link to the particular node.

In a particular embodiment, the method 1300 includes, at 1320, detecting data received from the first upstream node 1318. After data is received from the first upstream node 1318, the method may include, at 1322, sending a prune message to a second upstream node 1324.

At 1326, after the prune message is sent to the second upstream node 1324, a join message may be received, at 1326, from the second upstream node 1324. At 1328, in response to the join message from the second upstream node 1324, a link to the second upstream node 1324 may be added as a new downstream node. That is, whereas the second upstream node 1324 sent data to the particular node under an old multicast tree, in the alternate route, the second upstream node 1324 receives data from the particular note. The method 1300 also includes, at 1330, sending data to the new downstream node (i.e., second node 1324) via the added link.

Figure 12:
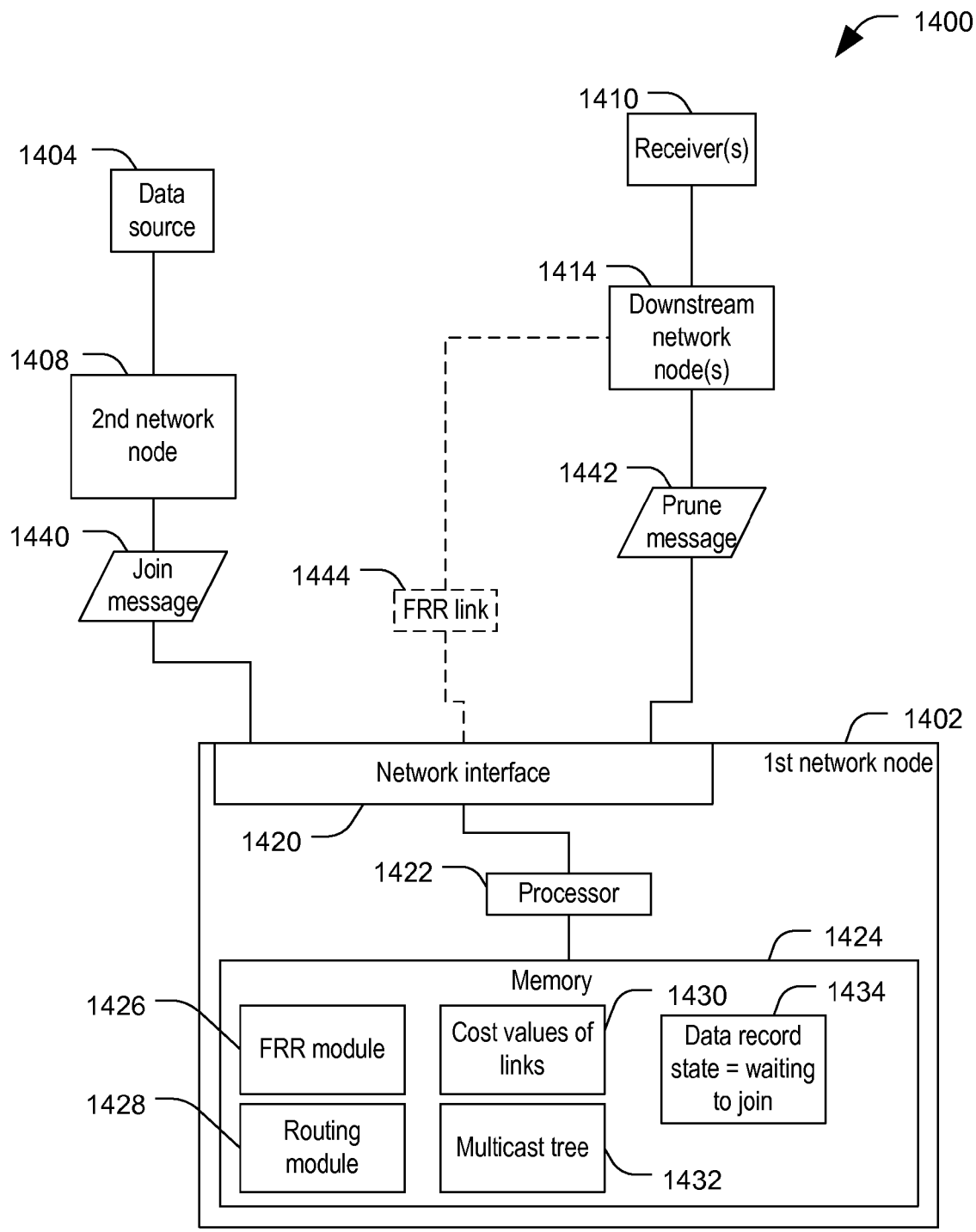
FIG. 12 is a block diagram of an embodiment of a system to route data.

FIG. 12 is a block diagram of a particular embodiment of a system to route data, designated generally 1400. The system 1400 includes a first network node 1402 coupled to a data source 1404 via one or more upstream nodes, such as a second network node 1408. The system 1400 also includes at least one receiver 1410 coupled to the first network node 1402. The at least one receiver 1410 may be coupled directly to the first network node 1402 or may be coupled via one or more downstream nodes 1414.

The first network node 1402 includes a network interface 1420 to receive data from the second network node 1408 of a data network. The network interface 1420 also sends data to the one or more downstream network nodes 1414 of the data network based on a multicast tree 1432. The multicast tree 1432 specifies which nodes send data to which other nodes. The first network node 1402 also includes a processor 1422 coupled to the network interface 1420, and a memory 1424 accessible to the processor 1422.

The memory 1424 includes a routing module 1428 that is executable by the processor 1422 to determine the multicast tree 1432. For example, the routing module 1428 determines the multicast tree 1432 based on cost values 1430 associated with links of the data network from the data source 1404 to the first network node 1402. The routing module 1428 may determine a new multicast tree in response to a link state advertisement indicating a failure in the data network. Alternately, the network interface 1420 may detect a failure of a link of the data network coupling the first network node 1402 to an upstream network node or a downstream network node 1414 of the data network. For example, the network interface 1420 may identify the network failure based on a heart beat signal that is expected from another network node but that is not received.

In a particular embodiment, when the routing module 1428 determines a new multicast tree, the routing module 1428 may also determine whether the new multicast tree would create a loop in the data network. For example, the routing module 1428 may determine whether an upstream network node in the new multicast tree is also a downstream network node in the multicast tree 1432. In another example, the routing module 1428 may determine whether implementing the new multicast tree would create a loop in the data network. To illustrate, the new multicast tree may identify a new upstream network node that is a current downstream network node of the first network node 1402. Thus, joining the new upstream network node would create a loop in the data network. After determining that the new multicast tree would create a loop in the data network, the routing module 1428 may store a data record 1434 indicating a waiting-to-join another network node state, where the other network node is an upstream node of the first network node 1402 in the new multicast tree.

The waiting-to-join another node state is maintained until the new multicast tree would no longer create a loop in the data network, or until another new multicast tree is determined (e.g., in response to a second failure of the data network). For example, after receiving a prune message from a downstream network node of the data network, the first network node 1402 may prune the link to the downstream network node. When pruning the link to the downstream network node means that the new multicast tree would not cause a loop in the data network, the first network node 1402 sends a join message 1440 to the previously downstream network node.

The first network node 1402 may also include a fast reroute (FRR) module 1426 to establish a FRR link 1444 to the downstream network node 1414. For example, the FRR module 1426 may establish the FRR link 1444 by using a label switching protocol to create a FRR tunnel. The FRR module 1426 may assign a reduced priority to data sent via the FRR link 1444.

Figure 13:
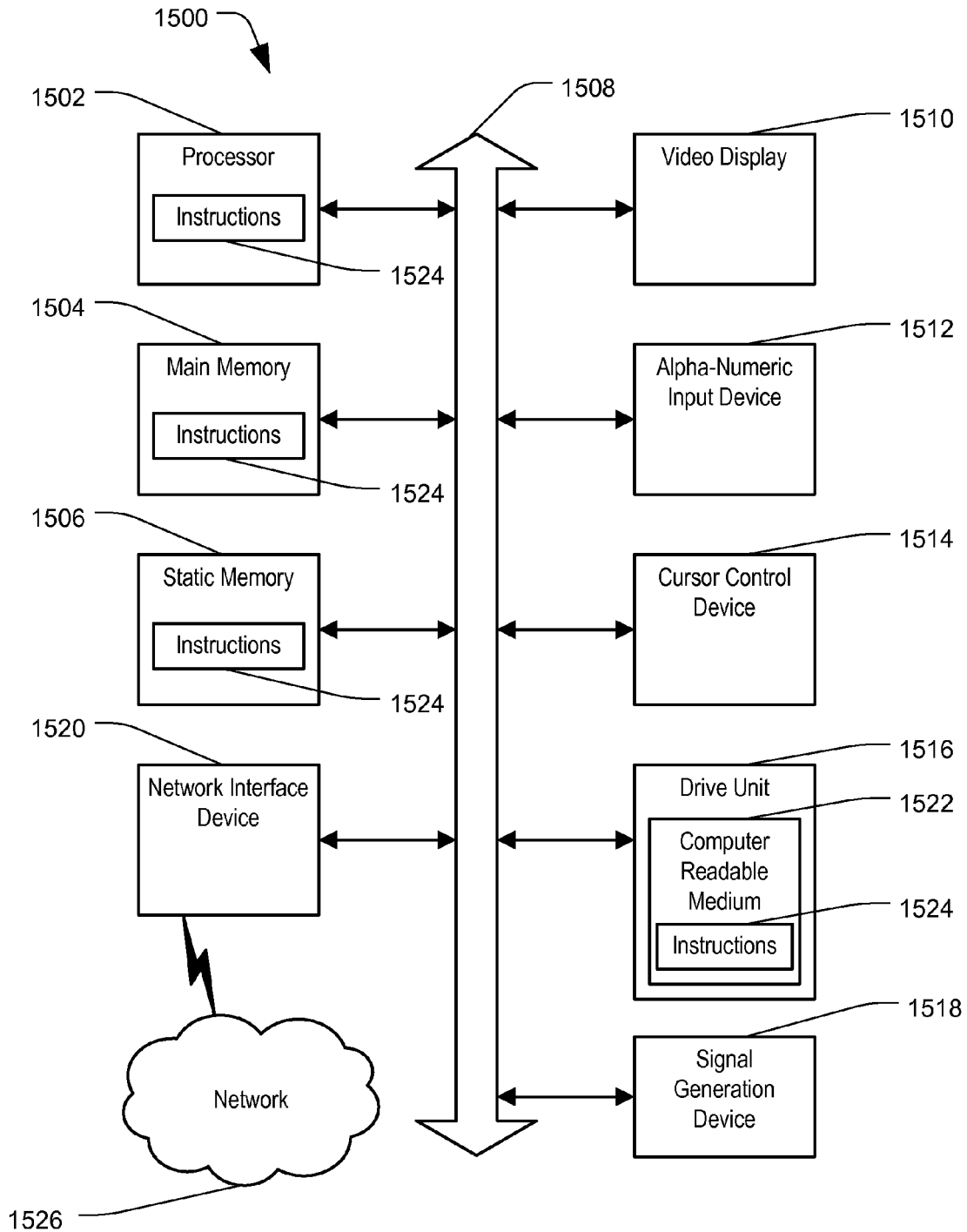
FIG. 13 is a block diagram of an embodiment of a general computing system.

Referring to FIG. 13, an illustrative embodiment of a general computer system is shown and is designated 1500. The computer system 1500 can include a set of instructions that can be executed to cause the computer system 1500 to perform one or more of the methods or computer based functions disclosed herein. The computer system 1500 may operate as a standalone device or may be connected, e.g., using a network, to other computer systems or peripheral devices. In various embodiments, the computer system 1500 includes or is included within any one or more of the network nodes or data sources discussed with references to FIGS. 1-12.

In a networked deployment, the computer system may operate in the capacity of a server or as a client user computer in a server-client user network environment, or as a peer computer system in a peer-to-peer (or distributed) network environment. The computer system 1500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single computer system 1500 is illustrated, the term "system" shall also be taken to include any collection of systems or sub-systems that individually or jointly execute a set, or multiple sets, of instructions to perform one or more computer functions.

As illustrated in FIG. 13, the computer system 1500 may include a processor 1502, e.g., a central processing unit (CPU), a graphics processing unit (GPU), or both. Moreover, the computer system 1500 can include a main memory 1504 and a static memory 1506, that can communicate with each other via a bus 1508. As shown, the computer system 1500 may further include a video display unit 1510, such as a liquid crystal display (LCD), an organic light emitting diode (OLED), a flat panel display, a solid state display, or a cathode ray tube (CRT). Additionally, the computer system 1500 may include an input device 1512, such as a keyboard, and a cursor control device 1514, such as a mouse. The computer system 1500 can also include a disk drive unit 1516, a signal generation device 1518, such as a speaker or remote control, and a network interface device 1520.

In a particular embodiment, as depicted in FIG. 13, the disk drive unit 1516 may include a computer-readable medium 1522 in which one or more sets of instructions 1524, e.g. software, can be embedded. Further, the instructions 1524 may embody one or more of the methods or logic as described herein. In a particular embodiment, the instructions 1524 may reside completely, or at least partially, within the main memory 1504, the static memory 1506, and/or within the processor 1502 during execution by the computer system 1500. The main memory 1504 and the processor 1502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1524 or receives and executes instructions 1524 responsive to a propagated signal, so that a device connected to a network 1526 can communicate voice, video or data over the network 1526. Further, the instructions 1524 may be transmitted or received over the network 1526 via the network interface device 1520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. A digital file attachment to an e-mail or other self-contained information archive or set of archives may be considered a distribution medium that is equivalent to a tangible storage medium. Accordingly, the disclosure is considered to include any one or more of a computer-readable storage medium or a distribution medium and other equivalents and successor media, in which data or instructions may be stored.

FIG. 14 is a diagram of a first particular embodiment of pseudo-code of cross-layer multicast reconfiguration. FIG. 14 is an example of pseudo-code that may be executed to provide a notification to registered entities when an IGP routing interface has changed.

FIG. 15 is a diagram of a second particular embodiment of pseudo-code of cross-layer multicast reconfiguration. FIG. 15 is an example of pseudo-code that may be executed to respond when a data packet is received at a wrong upstream interface.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    detecting, at a first node of a data network, a failure in the data network;
    determining, at the first node, an alternate route from the first node to a data source of the data network, wherein the alternate route includes a second node as an upstream node; and
    prior to sending a join request to the second node in response to the detected failure:
        determining, at the first node, that using the alternate route would create a loop in the data network; and
        setting a state of the first node to a waiting-to-join the second node state until the first node receives data from the second node.

2. The method of claim 1, further comprising sending the join request to the second node in response to receiving the data from the second node.

3. The method of claim 1, further comprising sending a notice of the failure to at least one other node of the data network.

4. The method of claim 1, further comprising receiving fast reroute data, at the first node, via a fast reroute link of the data network while the first node is set to the waiting-to-join the second node state.

5. The method of claim 1, wherein the data received from the second node is associated with a prune message that indicates an upstream link between the first node and the second node is to be removed, the method further comprising:
    pruning the upstream link;
    determining that the state of the first node is set to the waiting-to-join the second node state; and
    in response to pruning the upstream link, sending the join request to the second node.

6. The method of claim 5, further comprising:
    receiving additional data from the second node; and
    after receiving the additional data, sending a fast reroute prune message to a node associated with a fast reroute link.

7. The method of claim 1, wherein determining that using the alternate route would create a loop in the data network includes determining whether the second node would be a downstream node of the first node.

8. The method of claim 1, further comprising:
    receiving a plurality of packets at the first node, wherein at least one packet of the plurality of packets is associated with fast reroute data received at the first node from another node via a fast reroute link;
    determining a transmission priority of each of the plurality of packets, wherein the at least one packet received via the fast reroute link has a lower priority than other packets of the plurality of packets received via a non-fast reroute link; and
    sending the plurality of packets to one or more downstream nodes based on the determined transmission priority of each of the plurality of packets.

9. The method of claim 1, wherein detecting the failure in the data network includes receiving a link state advertisement from another node of the data network.

10. The method of claim 1, wherein determining the alternate route from the first node to the data source comprises determining a least cost route based on cost weights assigned to links of the data network.

11. The method of claim 1, wherein no data packets are lost as a result of the failure in the data network other than data packets in transit when the failure in the data network occurred.

12. The method of claim 1, wherein the failure in the data network occurs along a primary path of the first node and wherein the primary path of the first node is determined based on at least one of an available bandwidth or an inverse of the available bandwidth.

13. The method of claim 1, wherein the alternate route includes at least one link selected based on a high cost associated with the at least one link.

14. The method of claim 1, further comprising:
    detecting, at the first node of the data network, a second failure in the data network;
    determining a second alternate route from the first node to the data source of the data network, wherein the second alternate route includes a third node as an upstream node; and
    sending a join message to the third node.

15. A system, comprising:
    a first network node, comprising:
        a network interface to receive data from one or more upstream network nodes of a data network, and to send the data to one or more downstream network nodes of the data network based on a multicast tree; and
        a routing module coupled to the network interface, the routing module configured to:
            detect a failure of the data network;
            determine an alternate route from the first node to a data source of the data network, wherein the alternate route includes a second network node as an upstream node; and
            prior to sending a join request to the second node in response to the detected failure:
                determine that using the alternate route would create a loop in the data network; and
                set a state of the first network node to a waiting-to-join the second network node state until the first node receives data from the second network node.

16. The system of claim 15, wherein the data received from the second network node is associated with a prune message that indicates an upstream link between the first network node and the second network node is to be removed, wherein the routing module is further configured to send the join request to the second network node in response to removing the upstream link.

17. The system of claim 16, wherein the first network node further comprises a fast reroute module to establish a fast reroute link to one or more downstream network nodes using a label switching protocol.

18. The system of claim 16, wherein the fast reroute module is further configured to assign a first priority to data sent via the fast reroute link, wherein the first priority is lower than a second priority assigned to other data sent via a non-fast reroute link.

19. The system of claim 15, wherein the first network node stores a network topology of the data network and a routing table that identifies connections between network nodes of the data network, shortest paths between the first network node and other network nodes of the data network, and a primary path from the first network node to a next hop node.

20. The system of claim 19, wherein the first network node stores an initial backup path to the primary path.

21. A computer-readable storage device, comprising instructions that, when executed by a processor, cause the processor to:
    determine an alternate route from a first node to a data source of a data network in response to an identified failure in the data network, wherein the alternate route includes a second node as an upstream node; and prior to initiating transmission of a join request to the second node in response to the identified failure:
  determine that use of the alternate route would create a loop in the data network; and
  set a state of the first node to a waiting-to-join the second node state until the first node receives data from the second node.

* * * * *